United States Patent Office 3,387,981
Patented June 11, 1968

3,387,981
BITUMEN COMPOSITION OF IMPROVED
TEMPERATURE SUSCEPTIBILITY
Laurence F. King, Lambton County, Ontario, Canada,
assignor to Esso Research and Engineering Company,
a corporation of Delaware
No Drawing. Filed May 21, 1964, Ser. No. 369,309
6 Claims. (Cl. 106—279)

The present invention relates to bitumen materials. In general, it relates to compositions which comprise a combination of an oxidized solvent extract and a vacuum reduced residuum, which compositions possess unusual characteristics making the compositions eminently suitable, for example, as asphalt shingle sealants. Further, this invention relates to a process for preparing these compositions. In particular, the present invention concerns a composition suitable as a sealant for asphalt shingles, which composition comprises a combination of an air-oxidized phenol extract and a vacuum reduced aromatic residuum.

Bitumen, i.e., asphalt or pitch, compositions of high temperature susceptibility are useful in many applications. One such application is as a sealant for asphalt shingles. In such an application, the composition must meet rigid specifications; the most important of these specifications are set forth in Table I.

TABLE I

|  | Desired Specifications |  |  |
| --- | --- | --- | --- |
|  | Min. | Typical | Max. |
| Flash, ° F. (COC) | 500 |  |  |
| Softening Point, ° F | 165 |  | 187 |
| Penetration, 77° F |  | 2.5 |  |
| Penetration, 115° F | 12 |  | 17 |
| Soluble in CCl₄ (wt. percent) | 99.5 |  |  |
| Specific gravity | 1.04 |  |  |
| Viscosity, Saybolt Furol at 400° F |  |  | 80 |

Attempts in the prior art to produce a bitumen composition which meets all of the above specifications have resulted in failure in most instances; and where successful initially have not been successful in consistently producing such compositions on a commercial scale. For example, attempts to produce a composition of the above-described desired specifications from petroleum residua, e.g., a reduced crude, an aromatic tar from steam cracking, and catalytic fractionator bottoms after oxidation or straight reduction, have proved fruitless since the compositions do not possess the required high temperature susceptibility. All such compositions are too brittle at 115° F. A composition which does meet the above specification has in the prior art been produced by air-blowing a lubricating oil extract (i.e., the solvent extract of a lube distillate) in order to obtain a composition which meets the softening point and penetration requirements; however, the composition produced by this latter process has not proved to be an acceptable process on a commercial basis. For instance, refinery data have shown that only rarely can a straight lube extract be air-blown to sufficient hardness at 500° F., the normal oxidation temperature. When the product can be made, the time required for air-blowing is uneconomically long (>10 hrs.).

It has now been found and forms the basis of this invention that a composition meeting the specifications set forth in Table I can be prepared by combining an oxidized solvent extract and a vacuum reduced aromatic residuum in certain critical proportions.

The oxidized solvent extract suitable for use in this invention is derived from a lube oil distillate. The lube oil distillate must be from a napthenic base and will in general have a viscosity in the range of 75 to 150 SSU at 210° F. Paraffinic extracts are not compatible with aromatic residua since they precipitate asphaltenes from the latter. The solvent extract from which the oxidized solvent extracts of the present invention are produced are obtained from the solvent extraction of a lubricating oil distillate with a suitable solvent such as phenol. The solvent preferentially dissolves aromatic type components. The solvent extract is subsequently oxidized, for example by air-blowing, in order to produce the oxidized solvent extract useful in the present invention. The preparation of oxidized solvent extracts is well known to those skilled in the art and it is not intended that the above brief description limit the present invention in any respect. The oxidized solvent extract suitable for use in this invention will have the following specifications.

TABLE II.—INSPECTIONS OF OXIDIZED SOLVENT EXTRACT

| | Broad Range | Preferred Range | |
| --- | --- | --- | --- |
| Gravity, ° API | 10 | 6–0.7 | –3 |
| Sp. Gr., 60/60 ° F | 1.00 | 1.03–1.07 | 1.10 |
| Flash, COC, ° F | | 500+ | |
| C.C.R., percent | 5 | 10–20 | 30 |
| Sulphur, wt. percent | 1.5 | 2–4 | 4.5 |
| Softening Pt., ° F | 50 | 90–130 | 150 |

A preferred oxidized solvent extract suitable for use in this invention is one which is prepared by air oxidizing a phenol extract of a low cold temperature distillate having a viscosity in the range of about 102 to 107 SUS at 100° F. and has the following typical inspections.

TABLE III.—INSPECTIONS OF 120° F. SOFTENING POINT OXIDIZED PHENOL EXTRACT [1]

Specific gravity _____ 1.05
Flash, COC, ° F. _____ 500+
Sulphur, wt. percent _____ 3.5
C.C.R., percent _____ 16

[1] Prepared by air-blowing for 4.5 to 5.5 hrs. at 500° F. at 0.08 cu. ft./hr. This laboratory procedure correlates well with commercial practice.

The above-described 120° F. softening point material is preferred because of its compatibility with heavy aromatics and also because of its commercial availability.

The vacuum reduced aromatic residua useful in the present invention may comprise the bottoms from a catalytic cracker, aromatic tar from steam cracking, etc. In general, the vacuum reduced aromatic residua will have the following typical inspections.

TABLE IV.—INSPECTIONS OF VACUUM REDUCED AROMATIC RESIDUA

|  | Aromatic Tar from Steam Cracking (Vacuum reduced) | Bottoms from Catalytic Cracker (Vacuum reduced) |
| --- | --- | --- |
| Softening Point, ° F | 300 | 250 |
| Specific gravity, 60/60° F | 1.18 | 1.25 |
| Penetration: | | |
| At 77° F | 0.5 | 0.5 |
| At 115° F | 1.0 | 1.0 |
| Benzene Insol, percent | 4 | 3 |
| Asphaltenes, percent | 62 | 45 |
| Aromatics and Polar Compounds, percent | 38 | 55 |
| Saturates, percent | Trace | Trace |
| Coking Value,[1] percent | 55 | 50 |
| Boiling Range, ° F | 900+ | 975+ |

[1] Related to C.C.R.—usually 5 to 10 points lower than C.C.R.

A preferred vacuum reduced aromatic residuum is one which is prepared by distillation of aromatic tar (from steam cracking) at reduced pressure, 30–100 mm. Hg, to give overhead distillate, a sidestream and a bottoms fraction. This is essentially a flashing operation or perhaps 1 theoretical plate efficiency. The bottoms portion consists of 30–45 wt. percent of the feed tar and is a hard resinous pitch of 250–350° F. softening point. It has the following typical inspections:

| | |
|---|---|
| Softening point, ° F. | 300 |
| Specific gravity, 60/60° F. | 1.18 |
| Penetration at— | |
| 77° F. | 0.5 |
| 115° F. | 1.0 |
| Benzene insol, percent | 4 |
| Asphaltenes, percent | 62 |
| Aromatics and polar compounds, percent | 38 |
| Saturates, percent | Trace |
| Coking value,[1] percent | 55 |
| Boiling range, ° F. | 900+ |

[1] Related to C.C.R.—usually 5 to 10 points lower than C.C.R.

The alternative to aromatic tar as feed to the vacuum still is catalytic fractionator bottoms. Under the same conditions as above, 20–30% bottoms is produced, of 225–300° F. softening point and is a pitch very similar to that from tar. The two pitches are interchangeable in the present invention. The oxidized solvent extract is a "soft pitch" and the vacuum reduced aromatic residuum is a "hard pitch." The softening points of both can be varied within a range of about 50–150° F. and 225–350° F. respectively without seriously affecting the invention, but adjustments in the percentages of each component will be required to compensate.

In general, the composition of the present invention comprises a combination of about 60–75, preferably 64–69 wt. percent oxidized solvent extract and 25–40, preferably 31–36 wt. percent vacuum reduced aromatic residua. A preferred composition is a combination comprising about 31–36 wt. percent of a vacuum reduced aromatic residuum having about 300° F. softening point (ring and ball method) and 64–69 wt. percent of an air-blown phenol extract having about 120° F. softening point.

In order to more particularly describe the present invention, the following examples are included. It is intended that these examples be illustrative only and not limiting as regards the spirit and scope of this invention.

EXAMPLE 1

1200 grams of an oxidized solvent extract was prepared by air-blowing about 1300 grams of a phenol extract with an air flow rate of about 0.08 cubic foot per hour for a period of about 4½ to 5½ hours and at a temperature of about 500° F. The phenol extract used was prepared by phenol treating a low cold test distillate having a viscosity in the range of about 102–107 SUS at 210° F. and had the following typical inspections.

| | |
|---|---|
| Aniline point, ° F. | 89 |
| C.C.R., percent | 3.2 |
| Flash, COC, ° F. | 500+ |
| Gravity, ° API | 7.0 |
| Pour point, ° F. | 65 |
| Sulphur, wt. percent | 3.3 |
| Viscosity, SUS @ 210° F. | 270 |

The air-blown phenol extract had a softening point of 120° F. This product is Oxidized Solvent Extract A.

EXAMPLE 2

Oxidized Solvent Extract B was prepared in a manner identical to that used in Example 1 with the exception that the air-blowing lasted for a period of about 3½ to 4½ hours yielding a product which had a softening point of about 99° F.

EXAMPLE 3

A vacuum reduced aromatic residuum is prepared by distillation of aromatic tar, from steam cracking, at reduced pressure of about 30–100 mm. Hg, to give an overhead distillate, a sidestream and a bottoms fraction. The bottoms fraction consists of about 30–45 wt. percent of the feed and is a hard resinous pitch of 250–350° F. softening point. This product is Vacuum Reduced Aromatic Residuum Z.

In order to demonstrate the efficacy and the utility of the compositions of the present invention, several bitumen compositions were prepared including compositions utilizing the products of Examples 1–3 above. The properties of these compositions were determined and compared to the desired properties as defined by the specifications set forth in Table I. These compositions and their properties are set forth in Table V.

TABLE V.—BITUMEN COMPOSITIONS

| | Composition, wt. percent | | | | Properties | | |
|---|---|---|---|---|---|---|---|
| Formulation | Solvent Extract | Oxidized Solvent Extract | Residua | Vacuum Reduced Aromatic Residua | Softening Point, ° F. | Penetration, 77° F. | Penetration, 115° F. |
| D | | | [1] 100 | | 172 | 1.0 | 2.0 |
| E | | | [2] 55 | [3] 45 | 172.5 | 1.0 | 10.0 |
| F | [4] 50 | | | [3] 50 | | | |
| G | [5] 59 | | | [3] 41 | 170 | 9.0 | 22.0 |
| H | [5] 55 | | | [3] 45 | 197 | 2.0 | 8.0 |
| J | [5] 57 | | | [3] 43 | 163 | 12.5 | 35.0 |
| K | | [6] 70 | | [3] 30 | 174 | 7.0 | 20.0 |
| L | | [6] 64 | | [3] 36 | 186 | 2.5 | 10.0 |
| M | | [6] 66 | | [3] 34 | 184 | 4.0 | 11.0 |
| N | | 67.5 | | [3] 32.5 | 178.5 | 3.5 | 14.0 |
| O | | [7] 60 | | [3] 40 | 196 | 2.0 | 6 |
| P | | [7] 65 | | [3] 35 | 179 | 5.0 | 17 |
| Q | | [7] 63 | | [3] 37 | 190 | 3.0 | 11 |

[1] Partially reduced Catalytic Fractionator Bottoms, 950° F.+ Bottoms.
[2] Partially reduced Catalytic Fractionator Bottoms, 850° F.+ Bottoms, softening point below room temperature.
[3] From Example 3.
[4] Phenol extract from treating Paraffin Distillate 180/190 and having a viscosity of 1,000 SUS at 210, Pour Point of 105° F., Gravity of 3.5° API, Flash of 530+° F., C.C.R. of 10.8% and an Aniline Point of 140.
[5] Phenol extract of Examples 1 and 2.
[6] From Example 1.
[7] From Example 2.

The above data show that only with the composition of the present invention comprising a combination of certain proportions of an oxidized solvent extract and a vacuum reduced aromatic residua can all the specification requirements be fulfilled. All compositions prepared from other components failed, in one or more respects, to meet the required specifications.

Modifications within the scope of the above-described invention are contemplated and it is intended that the present invention should not be limited in any respect other than by the appended claims.

What is claimed is:

1. A bitumen composition consisting essentially of about 25 to 40 wt. percent of a vacuum reduced aromatic petroleum residuum having a softening point within the range between about 225° F. and 350° F. and about 60 to 75 wt. percent of an oxidized solvent extract derived from a lube oil distillate of a naphthenic base; said oxidized solvent extract having a softening point within the range between about 50° F. and 150° F.

2. A composition as defined by claim 1 wherein said oxidized solvent extract is an air oxidized phenol extract.

3. A composition as defined by claim 1 wherein said vacuum reduced aromatic petroleum residua has a softening point in the range of about 250 to 350° F.

4. A bitumen composition consisting essentially of about 64 to 69 wt. percent of an oxidized solvent extract having a softening point within the range between about 50° F. and 150° F. and being derived from a lube oil distillate of a naphthenic base and about 31 to 36 wt. percent vacuum reduced aromatic petroleum residuum having a softening point within the range between about 225° F. and 350° F.

5. A composition as defined by claim 4 wherein said oxidized solvent extract has a softening point of about 90 to 130° F. and wherein said vacuum reduced aromatic petroleum residua has a softening point of about 300° F.

6. A composition as defined by claim 5 wherein said oxidized solvent extract is an air oxidized phenol extract having a softening point of about 120° F.

References Cited

UNITED STATES PATENTS

| | | | |
|---|---|---|---|
| 3,304,191 | 2/1967 | Barrett | 106—279 |
| 2,319,942 | 5/1945 | Miller | 106—285 X |
| 2,395,996 | 3/1946 | Doyle | 106—279 X |
| 2,702,266 | 2/1955 | Kalinowski | 106—278 X |
| 2,778,780 | 1/1957 | Romberg | 208—4 |
| 3,131,140 | 4/1964 | Brice et al. | 208—4 |

FOREIGN PATENTS 6,405,550  11/1964  Netherlands.

ALEXANDER H. BRODMERKEL, *Primary Examiner.*

J. B. EVANS, *Assistant Examiner.*